(12) United States Patent
Basham et al.

(10) Patent No.: US 6,349,356 B2
(45) Date of Patent: *Feb. 19, 2002

(54) HOST-AVAILABLE DEVICE BLOCK MAP FOR OPTIMIZED FILE RETRIEVAL FROM SERPENTINE TAPE DRIVES

(75) Inventors: Robert Beverley Basham; Scott Milton Fry; John James Gniewek; Steven Douglas Johnson; Steven Bennett Wilson, all of Tucson, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,042

(22) Filed: Dec. 10, 1997

(51) Int. Cl.$^7$ ............................................. G06F 12/00
(52) U.S. Cl. ........................ 711/111; 711/158; 711/202
(58) Field of Search ............................... 711/111, 158, 711/202

(56) References Cited

U.S. PATENT DOCUMENTS

| | | | |
|---|---|---|---|
| 4,796,110 A | 1/1989 | Glass et al. | 360/53 |
| 4,858,039 A | 8/1989 | Mintzlaff | 360/72.2 |
| 5,121,270 A | 6/1992 | Alcudia et al. | 360/77.01 |
| 5,373,485 A | 12/1994 | Hogan et al. | 369/32 |
| 5,485,321 A | 1/1996 | Leonhardt et al. | 360/48 |
| 5,907,672 A | * 5/1999 | Matze et al. | 711/162 |

FOREIGN PATENT DOCUMENTS

| | | |
|---|---|---|
| JP | 07-114443 | 5/1995 |
| JP | 08-235775 | 9/1996 |

OTHER PUBLICATIONS

Hillyer, Bruce K., et al., "Random I/O Scheduling in Online Tertiary Storage Systems", ACM Conference, 1996, pp. 195–204.

* cited by examiner

*Primary Examiner*—Reginald G. Bragdon
(74) *Attorney, Agent, or Firm*—David W. Victor; Konrad Raynes Victor & Mann LLP (57) ABSTRACT

Optimizing the retrieval of blocks of data from a tape media of a longitudinal serpentine tape drive. A device block map (DBM) is retrieved from the tape media and stored in memory. The DBM comprises a table having one or more rows and one or more columns for each block of data stored on the tape media. The columns are selected from the group comprising a wrap column, a position column, a logical block column, and a file identifier column. One or more retrieval paths for requested blocks of data are determined from an image of the physical layout of the requested blocks on the tape media generated by linear interpolation of the DBM stored in memory. Each of the retrieval paths comprises an ordered sequence of the blocks of data and the manner in which the tape media is to be traversed to accomplish the retrieval of the ordered sequence. A sum of distances is determined for each of the retrieval paths and an optimal one of the retrieval paths is selected based on the determined sum of distances. Thereafter, the blocks of data are retrieved from tape media using the optimal retrieval path.

34 Claims, 4 Drawing Sheets

HOST-AVAILABLE DEVICE BLOCK MAP FOR OPTIMIZED FILE RETRIEVAL FROM SERPENTINE TAPE DRIVES

BACKGROUND OF THE INVENTION

1. Field of the Invention

The present invention relates in general to a file retrieval system, and in particular, to a file retrieval system including a host-available device block map for optimally retrieving one or more blocks of data from a serpentine tape drive.

2. Description of Related Art

As computer technology develops, data storage systems have become more sophisticated and require the storage and retrieval of greater amounts of data. Even though disk-based storage systems have evolved significantly, such storage systems still have problems in terms of both cost and scalability.

The use of tape-based storage systems for data processing, backup, and/or archival purposes is well known in the art. For example, tape storage systems have traditionally been applied to sequential processing such as batch updating of master files. Tape storage systems also are used in data mining applications where thousands of queries are aggregated in one complete sequential scan of the data.

Advances in magnetic tape storage technology and devices have led to greatly increased capacity per cartridge. With the increase in capacity and new applications, there is a concomitant increase in the number of objects that may be stored per cartridge. indeed, the use of tape storage systems can be as much as two orders of magnitude more efficient than disk storage systems, in terms of cost per byte recorded and the number of bytes stored per unit (cartridge, etc.). However, one problem with tape storage systems is that the random access latency of tape is several orders of magnitude slower than disk storage systems.

New longitudinal tape formats such as IBM 3570 and IBM 3590 drives employ a tape track format described as serpentine longitudinal. These formats differ from previous IBM 3480/3490 drives in one regard by having higher track densities, thereby resulting in multiple tape passes in both the "out" and "in" directions.

In contrast, 18 track IBM 3480 drives write data only in the out direction and 36 track IBM 3490 drives write one set of tracks "out" and one set of tracks "in". Optimized retrieval sequences for these devices comprise straightforward sequential ordering with no requirement for specialized ordering.

With IBM 3570 and IBM 3590 drives, however, there are 16 "out" and "in" tracks and 4 "out" and "in" tracks, respectively. Access to these tracks is accomplished by indexing the heads of the drive, a process that is very rapid as compared to searching the length of tape media.

In general, a serpentine longitudinal tape drive records data on a wrap (i.e., track) or a group of wraps in one direction along a length of the serpentine longitudinal tape media. Then, the tape drive reverses the recording direction and shifts its recording heads sideways a small distance to record another wrap or group of wraps in the opposite direction along the length of the tape. The tape drive continues these operations back and forth along the serpentine longitudinal tape media until all of the blocks of data are written.

Alternatively, instead of shifting its heads sideways a small distance to record another wrap or group of wraps, the serpentine longitudinal tape drive may electronically select another recording head or group of recording heads and move up the length of the tape media and continue back and forth until all of the blocks of data are written to the tape media. It will be appreciated, of course, that other types of recording techniques can be used as well.

As a result, a straightforward sequential retrieval order for serpentine longitudinal tape drives is most likely not optimized. The sequential retrieval order usually bears no relationship to the physical location of the blocks of data stored on serpentine tape media. Accordingly, the random retrieval of the blocks of data which are spaced apart on the serpentine tape can cause a significant latency. Indeed, for serpentine tape, the random retrieval of blocks of data spaced relatively far apart on the tape will likely result in grossly sub-optimal performance, if the blocks of data are retrieved in sequential order with respect to the order they were written.

Various techniques and systems for recording data on and retrieving data from a tape and for reducing access latency are known in the art. For example, the publication by Bruce K. Hillyer and Avi Silberschatz, entitled "Random I/O Scheduling in Online Tertiary Storage Systems", ACM Conference, 1996, describes techniques for I/O scheduling for tape drives to resolve the problem of access latency. U.S. Pat. No. 5,485,321 issued to Leonhardt et al. entitled "Format and Method for Recording Optimization" discloses a serpentine recording technique for reducing access time. U.S. Pat. No. 5,373,485 issued to hogan et al. entitled "Method for Locating Data in a Data Cartridge System" discloses a physical and logical block search for data on a serpentine pattern which eliminates search time. U.S. Pat. No. 5,121,270 issued to Alcudia et al. entitled "Multitransducer Head Positioning Servo for Use in a Bi-directional Magnetic Tape System" discloses a serpentine recording mode of operation. U.S. Pat. No. 4,858,039 issued to Mintzlaff entitled "Streaming Tape Drive With Direct Block Addressability" discloses reducing the time for retrieving a selected block of data recorded in a serpentine fashion. U.S. Pat. No. 4,796,20 issued to Glass et al. entitled "System and Method for Encoding and Storing Digital Information on Magnetic Tape" discloses a system for increasing the speed of serpentine tape writes and reads. Japanese publication JP 8-235775 (English abstract only) discloses a device for access to linear serpentine tape. Japanese publication JP 7-24443 (English abstract only) discloses shortening the access time to a file stored in a magnetic tape of a serpentine track system.

However, none of these patents or publications provide a completely satisfactory solution to the above mentioned problems in retrieving files stored on serpentine longitudinal tape media. It should thus be apparent that a need exists for methods for optimized file retrieval from serpentine longitudinal tape media.

SUMMARY OF THE INVENTION

To overcome the limitations in the prior art described above, and to overcome other limitations that will become apparent upon reading and understanding the present specification, the present invention discloses a method, apparatus, and article of manufacture for optimizing the retrieval of blocks of data from a serpentine longitudinal tape media. A device block map (DBM) is stored on the tape media, wherein the DBM comprises a table having one or more rows and one or more columns for each block of data stored on the tape media. The columns are selected from a group comprising a wrap column, a position column, a logical block number column, and a file identifier column wherein the wrap column indicates a track where the block of data is recorded on the tape media, the position column indicates a physical position where the block of data is recorded on the tape media, the logical block number column indicates a logical block number for the block of data, and a file identifier column indicates a logical file identifier for the block of data. One or more retrieval paths for the blocks of data are determined from the device block map, wherein each of the retrieval paths comprises an ordered sequence of the blocks of data and the manner in which the tape media is to be traversed to accomplish the retrieval of the ordered sequence. A sum of distances is determined for each of the retrieval paths and an optimal one of the retrieval paths is selected based on the determined sum of distances. Thereafter, the blocks of data are retrieved from the tape media using the optimal retrieval path.

One advantage of the present invention is that it provides a significant improvement in the latency of random access to files stored on a serpentine longitudinal tape media. Another advantage is that the present invention provides a portable device block map which is accessible from the tape media.

Other advantages, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

DETAILED DESCRIPTION OF THE ILLUSTRATED EMBODIMENTS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
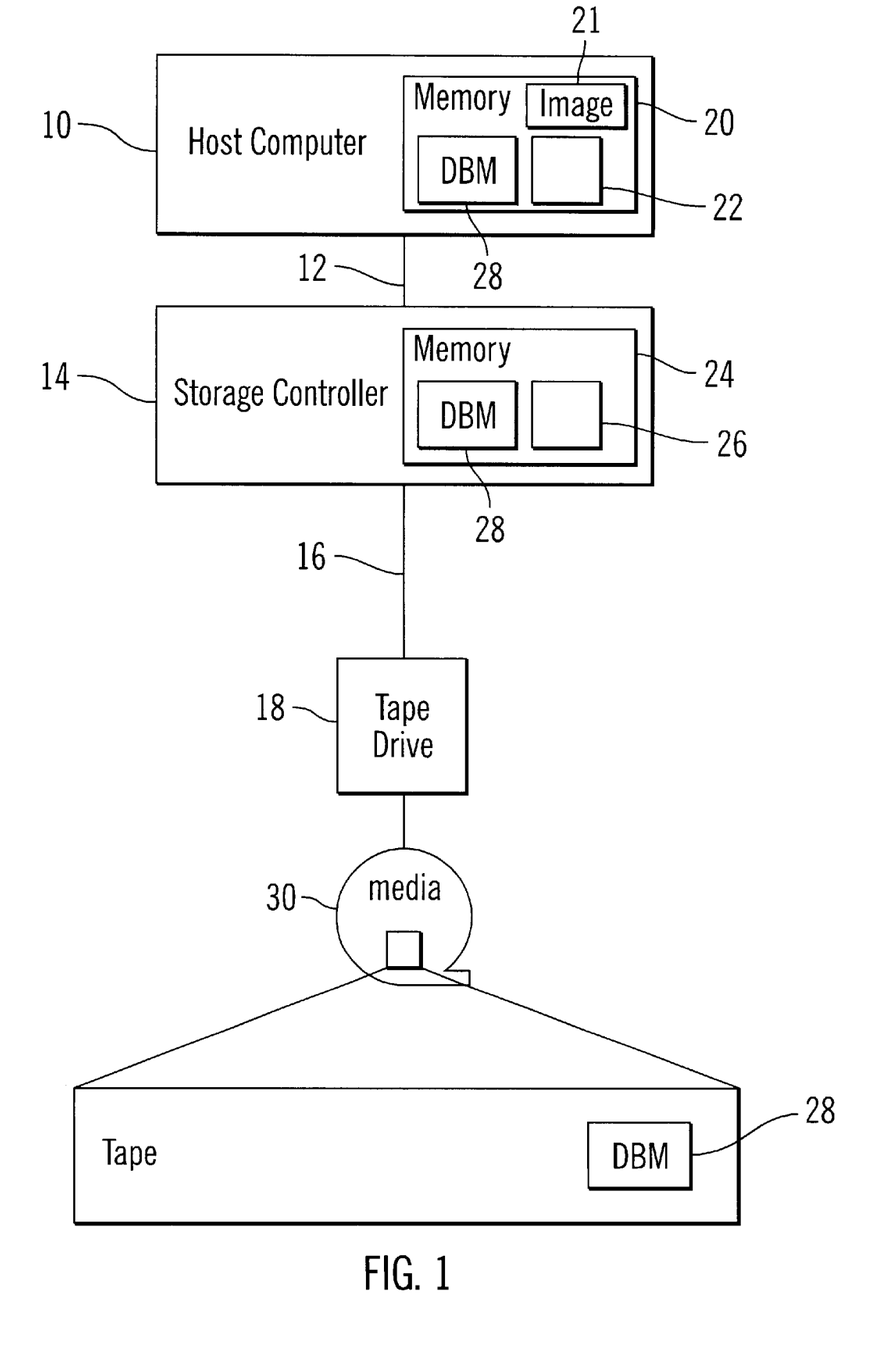
FIG. 1 is a block diagram of a host available device block map file retrieval system consistent with the present invention.

FIG. 1 is an exemplary hardware environment used to implement the preferred embodiment of the invention. A host computer 10 is coupled via a bus 12 to a storage controller 14, which itself is coupled via an I/O channel 16 to one or more data storage devices 18. In the preferred embodiment, the data storage device 18 comprises a tape drive. Of course, those skilled in the art will recognize that any data storage device may be used with the present invention.

The host computer 10 has its own memory 20 and executes a program or logic 22 that controls the operation of the host computer 10 and its interaction with the storage controller 14 and the tape drive 18. In the preferred embodiment, the program 22 comprises a tape library manager, backup/restore utility or database management system, although other programs or logic may be used as well.

Similarly, the storage controller 14 has its own memory 24 and executes a program or logic 26 that controls the operation of the storage controller 14 and its interaction with the host computer 10 and tape drive 18. In the preferred embodiment, the program 26 provides the read/write logic to the tape drive 18 and the host computer 10, although other functions may be provided as well.

Under the control of the storage controller 14, the tape drive 18 retrieves a device block map (DBM) 28 from a specified location on the serpentine longitudinal tape media 30 and stores the DBM 28 in a memory 24 of the storage controller 14. The DBM 28 indicates the physical layout of one or more blocks of data stored on the serpentine longitudinal tape media 30. Thereafter, some or all of the DBM 28 may be transferred to the host computer 10.

The program 22 executed by the host computer 10 performs linear interpolation on the DBM 28 to control the operation of the host computer 10 and its interaction with the storage controller 14 and the tape drive 18, as described in more detail below. The program 22 determines one or more retrieval paths for the blocks of data from the tape media 30 using the DBM 28, wherein each of the retrieval paths comprises an ordered sequence of the blocks of data and the manner in which the tape media 30 is to be traversed by the tape drive 18 in order to accomplish the retrieval of the ordered sequence. The program 22 determines a sum of distances for each of the retrieval paths and selects an optimal one of the retrieval paths based on the determined sum of distances. Thereafter, the host computer 10, under the control of the program 22, instructs the controller 14 to retrieve the blocks of data from the tape media 30 by the tape drive 18 using the optimal retrieval path.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Those skilled in the art will also recognize that the present invention may be implemented as a method, apparatus, or article of manufacture using standard programming and/or engineering techniques to produce software, firmware, hardware, or any combination thereof. The term "article of manufacture" as used herein is intended to encompass any device, carrier, or media that provides access to instructions and/or data useful in performing the same or similar functionality. Of course, those skilled in the art will recognize many modifications may be made to this configuration without departing from the scope of the present invention.

Device Block Map

Figure 2:
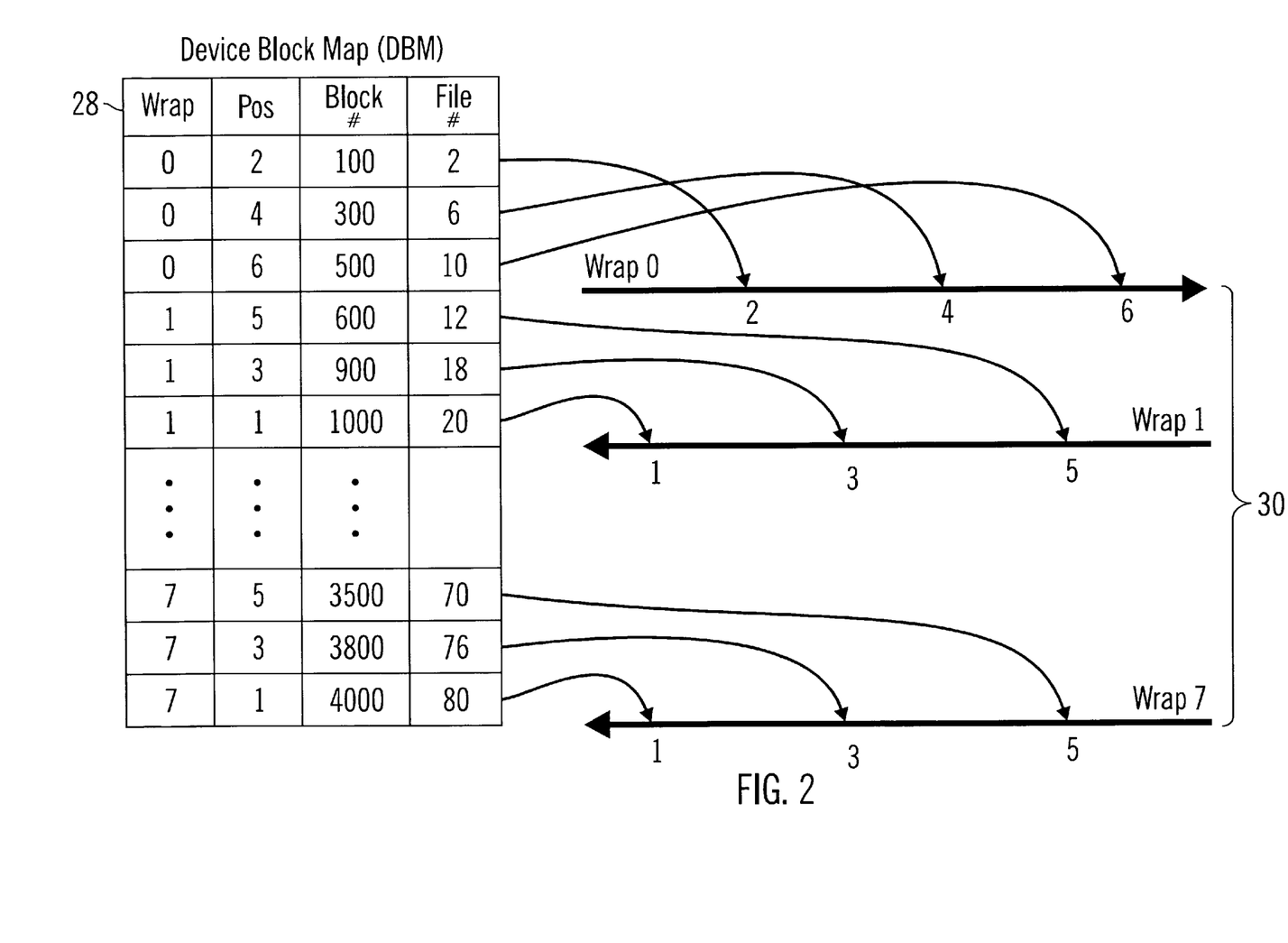
FIG. 2 is an exemplary device block map in relationship with a depiction of physical locations of files stored on a storage medium consistent with the invention.

FIG. 2 is a block diagram that illustrates an exemplary structure for the DBM 28 according to the present invention. The DBM 28 comprises a table having one or more rows and one or more columns. In this exemplary structure, the DBM 28 is comprised of a plurality of rows and at least four columns (Wrap, Pos, Block #, and File #). Each of the rows correspond to a block of data stored on the tape media 30 and the columns indicate the Wrap (track), Pos (physical position), Block # (logical block number), and File # (logical file identifier) of the block of data.

The Wrap value in the DBM 28 indicates the wrap (or track) where the block of data is recorded on the serpentine longitudinal tape media 30, as is illustrated in FIG. 2. In general, each even numbered wrap is recorded in a forward direction (to the right in FIG. 2), and each odd numbered wrap is recorded in a backward direction (to the left in FIG. 2). It will be appreciated that the recording sequence can be varied in many ways, e.g. different directions, alternating directions at some other increment, without departing from the scope or spirit of the present invention.

The Pos value in the DBM 28 indicates the physical position where the block of data is recorded on the serpentine longitudinal tape media 30. Preferably, a marker or other indicator is recorded at this position on the tape media 30 to denote the beginning and/or ending location of one or more adjacent blocks of data. It will be appreciated that any other position values, such as a middle location of the block of data, can be used without departing from the scope of the present invention.

The Block # value in the DBM 28 indicates the logical block number for the block of data recorded on the serpentine longitudinal tape media 30. Files are comprised of one or more blocks of data, and each block of data is recorded separately on the serpentine longitudinal tape media 30.

The File # value in the DBM 28 indicates the logical file number (or other identifier) for the block of data recorded on the serpentine longitudinal tape media 30. This allows one or more blocks of data to be identified as collectively comprising a logical file, even when the blocks of data are recorded at different locations on the serpentine longitudinal tape media 30.

For the purposes of illustration in this preferred embodiment, all the blocks of data associated with a particular File # value in the DBM 28 are grouped together as adjacent rows in the DBM 28 and are stored recorded together as adjacent blocks of data on one or more wraps of the serpentine longitudinal tape media 30. Of course, those skilled in the art will recognize that the blocks of data could be recorded non-contiguously without departing from the scope of the present invention.

Figure 3A:
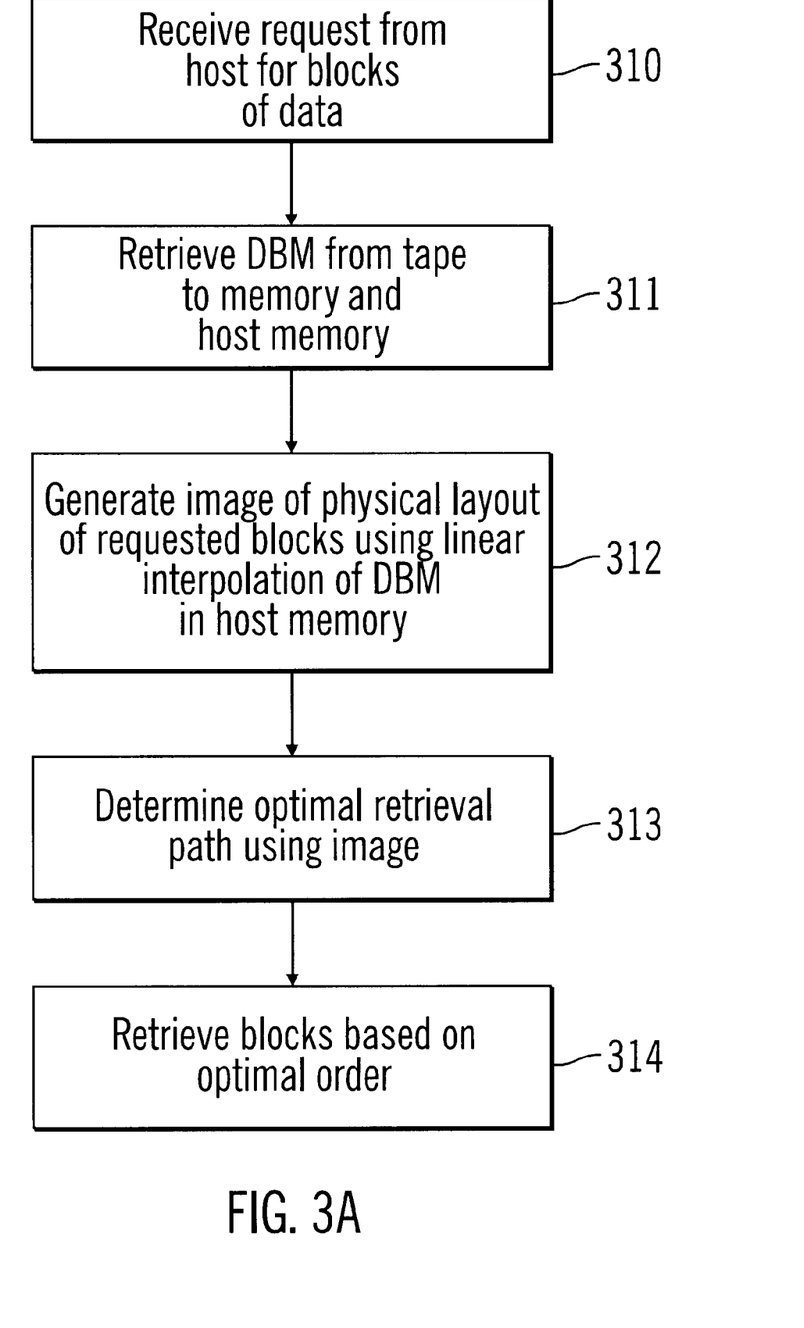
FIG. 3A is a flowchart illustrating an operation of retrieving a device block map from a tape and venerating an image of the physical layout of selected blocks in order to determine an optimal retrieval path.

Accordingly, with reference to FIG. 3A, upon receiving a request to retrieve one or more files from the tape media 30 (block 310), some or all of the DBM 28 is retrieved from the tape media 30 and stored in the memory 24 of the storage controller 14. Thereafter, some or all of the DBM 28 is transferred to the host computer 10 and stored in the memory 20 of the host computer (block 311).

Using linear interpolation on the DBM 28, the host computer 10 generates an image in its memory 20 of the physical layout of the desired blocks of data stored on the serpentine longitudinal tape media 30 (block 312) and determines the physical location and length of any given block of data with a specified accuracy. Thereafter, as a result of this linear interpolation, the host computer 10 and the tape drive 18 are able to determine an optimal retrieval path for the blocks of data from the serpentine longitudinal tape media 30 (block 313) and retrieve the blocks of data using the optimal retrieval path (block 314).

Optimizing the retrieval path according to the present invention takes into account the wrap format of the serpentine longitudinal tape media 30. Hence, by allowing for wrap jumping (a very rapid process) and by using the DBM 28 to determine the longitudinal position of the beginning and ending points of each of the blocks of data to be retrieved from the media 30, the problem becomes one of minimizing the sum of the travel distance along the tape media for a complete circuit of all the desired files.

Each subset of the travel distance is defined as:

$$TO_{ij} = |E_i - B_j|$$

which is the distance from the end of file "i" to the beginning of file "j". Thus, the optimal retrieval path is:

$$TO_{opt} = \min(\Sigma_{ij}|E_i - B_j|)$$

where the retrieval sequence is optimized to give a minimum value for $TO_{opt}$.

This problem, which is similar to the "traveling salesman" type of problem, can be described more accurately as being in the class of an "asymmetric Hamiltonian Path" problem. As the number of objects increase, the number of possible sequences grows as N! (N factorial). For a large N, the most usual approach to solving this problem is to employ a heuristic method.

As described below, the present invention describes one of the simplest of the many possible such methods and the incorporation of such a method into the storage subsystem in a manner that interacts with the data management software and drive logic to give improved multi-object retrieval response time.

Optimal Retrieval Logic

Figure 3B:
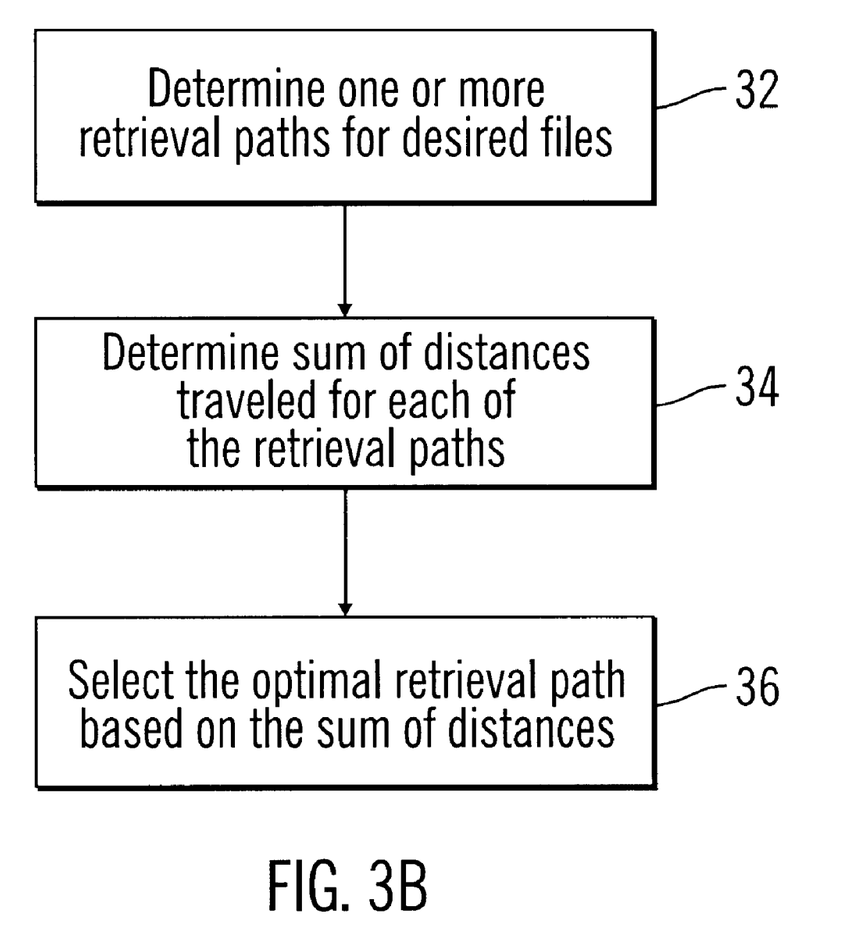
FIG. 3B is a flowchart illustrating an operation of determining an optimized path of retrieving the files consistent with the present invention.

FIG. 3B is a flowchart that illustrates the steps performed in determining an optimal retrieval path according to the present invention.

Block 32 represents the host computer 10 determining one or more retrieval paths for the files to be retrieved from the serpentine longitudinal tape media 30 based on the DBM 28. Each of the retrieval paths comprises an ordered sequence of files to be retrieved from the tape media 30 and the main in which the tape media 30 is to be traversed by the tape drive 18 to accomplish the retrieval of the files in the ordered sequence.

Block 34 represents the host computer 10 determining a sum of distances traveled along the tape media 30 to retrieve each of the files for each of the retrieval paths. In the preferred embodiment, where all of the blocks of data comprising a file are recorded contiguously, the distances are defined between an ending location of a last block of data for a first file and the nearest starting location of a first block of data for a second file. Then, the next distance is defined from the ending location of the last block of the second file to the nearest starting location of the first block of a third file, and so on. Of course, in other embodiments where the blocks of data are not recorded contiguously, modifications are required to this calculation.

Since each retrieval path relates to a different ordering of the retrieval of the desired files, the sum of distances traveled for different retrieval paths most likely are different. The smallest sum of distances traveled represents the shortest path for the tape drive 18 to traverse along the tape media 30 to retrieve the desired files. In other words, the smallest sum of distances traveled among the different retrieval paths is the optimal path for the retrieval of the desired files.

Block 36 represents the host computer 10 selecting the optimized path to retrieve the desired files from the tape media 30 via the tape drive 18.

In a preferred embodiment, these steps would be performed by a library manager 22 executed by the host computer 10. Alternatively, those skilled in the art will recognize that this method could also be performed by the program or logic 26 in the storage controller 14 rather than the host computer 10. In either embodiment, the input would be the file identifiers and the Beginning and End locations and, the output would be the ordered sequence of retrieval of these objects that results in minimum total travel distance.

Although a "nearest neighbor" method of optimal retrieval is described herein as an example, those skilled in the art would recognize that other methods may be used as well, without departing from the scope of the present invention. For example, other methods may comprise a "second nearest neighbor", "third nearest neighbor", or "nth nearest neighbor" method. Improved methods will undoubtedly be developed and could be expected to improve upon the minimum travel distance. Further, there may be other more efficient implementations that are more practical for product use.

Conclusion

This concludes the description of the preferred embodiment of the invention. The following paragraphs describe some alternative methods of accomplishing the same objects.

In alternative embodiments of the present invention, other types and configurations of computers could be used. For example, the invention need not be restricted to the hardware and software configuration illustrated herein. For example, mainframes, minicomputers, or personal computers could be used with the present invention. In another example, peripherals other than tape drives could benefit from the present invention.

In alternative embodiments of the present invention, other structures and values for the device block map (DBM) could be used. For example, the invention need not be restricted to tables, rows, or columns as illustrated herein. Further, the types of rows and columns, and the data they embody, are not restricted to the those illustrated herein.

In alternative embodiments of the present invention, the logic described herein could be performed by other types of hardware. For example, the invention need not be restricted to programs or logic executed by host computers and storage controllers as illustrated herein. Instead, the logic of the invention could be performed by embedded processors or specialized electronic circuitry.

In alternative embodiments of the present invention, other methods of optimizing retrieval may use other methods with the device block map (DBM). For example, the invention need not be restricted to the "traveling salesman" or "Hamiltonian Path" techniques described herein. Those skilled in the art will recognize that other methods could optimize retrieval of data using the device block map of the present invention.

In summary, the present invention discloses a method, apparatus, and article of manufacture for optimizing the retrieval of blocks of data from a tape media of a longitudinal serpentine tape drive. A device block map (DBM) is stored on the tape media, wherein the DBM comprises a table having one or more rows and one or more columns for each block of data stored on the tape media. The columns are selected from a group comprising a wrap column, a position column, a logical block number column, and a file identifier column, wherein the wrap column indicates a track where the block of data is recorded on the tape media, the position column indicates a physical position where the block of data is recorded on the tape media, the logical block number column indicates a logical block number for the block of data, and a file identifier column indicates a logical file identifier for the block of data. One or more retrieval paths for the blocks of data are determined from the device block map, wherein each of the retrieval paths comprises an ordered sequence of the blocks of data and the manner in which the tape media is to be traversed to accomplish the retrieval of the ordered sequence. A sum of distances is determined for each of the retrieval paths and an optimal one of the retrieval paths is selected based on the determined sum of distances. Thereafter, the blocks of data are retrieved from the tape media using the optimal retrieval path.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for retrieving one or more blocks of data from a tape media, the method comprising:
   (a) receiving a request to retrieve multiple groups of at least one block of data, wherein a beginning and end location of at least two of the groups are discontinuous;
   (b) retrieving a device block map from a tape media indicating positions of the groups of at least one block of data on the tape media;
   (c) generating, from the device block map, in memory an image of a physical layout of the requested groups of at least one block of data on the tape;
   (d) determining an optimal order to retrieve the requested groups of data based on the physical layout of the requested groups indicated in the image in a manner that minimizes a distance traveled when retrieving the requested groups of at least one block of data; and
   (e) retrieving the requested groups of at least one block of data from the tape media using the determined optimal order.

2. The method of claim 1, wherein the tape media is a serpentine longitudinal tape media having a plurality of wraps.

3. The method of claim 2, wherein determining the minimum distance between the requested groups of at least one block considers a wrap format of the serpentine longitudinal tape media to allow forward jumping when moving from the end location of one group to the beginning location of a next group in the optimal order.

4. The method of claim 1, wherein the device block map comprises a table having one or more rows for each block of data.

5. The method of claim 4, wherein the table has one or more columns selected from a group comprising a wrap column, a position column, a logical block number column, and a file identifier column.

6. The method of claim 5, wherein the wrap column indicates a track where the block of data is recorded on the tape media.

7. The method of claim 5, wherein the position column indicates a physical position where the block of data is recorded on the tape media.

8. The method of claim 7, wherein a marker is recorded on the tape media at the physical position.

9. The method of claim 7, wherein the physical position is selected from a group comprising a beginning location, an ending location, and a beginning and ending location.

10. The method of claim 1, wherein the device block map is stored at a specified location on the tape media.

11. The method of claim 1, wherein the device block map indicates a layout for the blocks of data on the tape media.

12. The method of claim 1, further comprising interpolating the device block map to generate the image of the layout of the blocks of data in memory.

13. The method of claim 1, wherein determining the optimal order further comprises:
  (1) determining one or more retrieval paths based on the image of the layout of the requested groups of the at least one block of data in memory, wherein each of the retrieval paths comprises an ordered sequence of the requested groups of the at least one block of data and the manner in which the tape media is to be traversed to accomplish the retrieval of the ordered sequence;
  (2) determining a sum of distances for each of the retrieval paths;
  (3) selecting an optimal one of the retrieval paths based on the determined sum of the distances; and
  (4) retrieving the blocks of data from the tape media using the optimal retrieval path.

14. The method of claim 1, wherein the optimal order comprises a minimum travel distance of the tape media for the requested groups of at least one block.

15. The method of claim 1, wherein each group of at least one block comprises a file, and the device block map indicates each file and the data blocks that comprise the file.

16. An apparatus for retrieving one or more blocks of data from a tape media, comprising:
  (a) a processor coupled to a tape drive for the tape media; and
  (b) a plurality of computer instructions, executed by the processor, for:
    (i) receiving a request to retrieve multiple groups of at least one block of data, wherein a beginning and end location of at least two of the groups are discontinuous;
    (ii) retrieving a device block map from the tape media indicating positions of the groups of at least one block of data on the tape media;
    (iii) generating, from the device block map, in memory an image of a physical layout of the requested groups of at least one block of data on the tape;
    (iv) determining an optimal order to retrieve the requested groups of data based on the physical layout of the requested groups indicated in the image in a manner that minimizes a travel distance when retrieving the requested groups of at least one block of data; and
    (v) retrieving the requested groups of at least one block of data from the tape media using the determined optimal order.

17. The apparatus of claim 16, wherein the tape media is a serpentine longitudinal tape media having a plurality of wraps.

18. The apparatus of claim 17, wherein determining the minimum distance between the groups of at least one block considers a wrap format of the serpentine longitudinal tape media to allow for wrap jumping when moving from the end location of one group to the beginning location of a next group in the optimal order.

19. The apparatus of claim 17, wherein the device block map comprises a table having one or more rows for each block data.

20. The apparatus of claim 19, wherein the table has one or more columns selected from a group comprising a wrap column, a position column, a logical block number column, and a file identifier column.

21. The apparatus of claim 20, wherein the wrap column indicates a track where the block of data is recorded on the tape media.

22. The apparatus of claim 16, wherein the instructions are further capable of causing the processor to perform interpolating the device block map to generate the image of the layout of the requested groups of at least on block of data in memory.

23. The apparatus method of claim 16, wherein determining the optimal order further comprises:
  (1) determining one or more retrieval paths based on the image of the layout of the groups of the at least one block of data in memory, wherein each of the retrieval paths comprises an ordered sequence of the groups of the at least one block of data and the manner in which the tape media is to be traversed to accomplish the retrieval of the ordered sequence;
  (2) determining a sum of distances for each of the retrieval paths;
  (3) selecting an optimal one of the retrieval paths based on the determined sum of the distances; and
  (4) retrieving the blocks of data from the tape media using the optimal retrieval path.

24. The apparatus of claim 16, wherein the optimal order comprises a minimum travel distance of the tape media for the groups of at least one block.

25. The apparatus of claim 16, wherein each group of at least one block comprises a file, and the device block map indicates each file and the at least one block that comprise the file.

26. An article of manufacture embodying logic capable of causing a processor to retrieve one or more blocks of data from a tape media accessed by a tape drive by:
  (a) receiving a request to retrieve multiple groups of at least one block of data, wherein a beginning and end location of at least two of the groups are discontinuous;
  (b) retrieving a device block map from the tape media indicating positions of the groups of at least one block of data on the tape media;
  (c) generating, from the device block map, in memory an image of a physical layout of the requested groups of at least one block of data;
  (d) determining an optimal order to retrieve the requested groups of data based on the physical layout of the requested groups indicated in the image in a manner that minimizes a travel distance when retrieving the requested groups of at least one block of data; and
  (e) retrieving the requested groups of at least one block of data from the tape media using the determined optimal order.

27. The article of manufacture of claim 26, wherein the tape media is a serpentine longitudinal tape media having a plurality of wraps.

28. The article of manufacture of claim 27, wherein determining the minimum distance between the groups of at least one block considers a wrap format of the serpentine longitudinal tape media to allow for wrap jumping when moving from the end location of one group to the beginning location of a next group in the optimal order.

29. The article of manufacture of claim 26, wherein the device block map comprises a table having one or more rows for each block data.

30. The article of manufacture of claim 29, wherein the table has one or more columns selected from a group comprising a wrap column, a position column, a logical block number column, and a file identifier column.

31. The article of manufacture of claim 30, wherein the wrap column indicates a track where the block of data is recorded on the tape media.

32. The article of manufacture of claim 26, wherein the article of manufacture is further capable of causing the processor to perform interpolating the device block map to generate the image of the layout of the requested groups of at least one block of data in memory.

33. The article of manufacture of claim 26, wherein determining the optimal order further comprises:

(1) determining one or more retrieval paths based on the image of the layout of the groups of the at least one block of data in memory, wherein each of the retrieval paths comprises an ordered sequence of the groups of the at least one block of data and the manner in which the tape media is to be traversed to accomplish the retrieval of the ordered sequence;

(2) determining a sum of distances for each of the retrieval paths;

(3) selecting an optimal one of the retrieval paths based on the determined sum of the distances; and (4) retrieving the blocks of data from the tape media using the optimal retrieval path.

34. The article of manufacture of claim 26, wherein each group of at least one block comprises a file, and the device block map indicates each file and the at least one data block that comprise the file.

\* \* \* \* \*